United States Patent Office 3,436,357
Patented Apr. 1, 1969

3,436,357
CATALYST AND CONVERSION OF ORGANIC COMPOUNDS IN THE PRESENCE THEREOF
Charles J. Plank, Woodbury, and Edward J. Rosinski, Almonesson, N.J., assignors to Mobil Oil Corporation, a corporation of New York
No Drawing. Filed May 17, 1962, Ser. No. 195,430
The portion of the term of the patent subsequent to July 7, 1981, has been disclaimed
Int. Cl. B01j 11/40
U.S. Cl. 252—455         25 Claims This invention relates to an improved catalyst useful in the conversion of organic compounds and to a method for preparing the same. The invention is further directed to a process for converting hydrocarbons in the presence of such catalyst. More particularly, the present invention is concerned with the composition, preparation and use of active, selective and stable catalysts comprising a finely divided crystalline aluminosilicate having a silica to alumina mole ratio in excess of 3 distributed throughout and held suspended in a matrix of a binder therefor and wherein the negative electrovalence of the silica and alumina of the aluminosilicate is balanced by ions of at least one member selected from the group consisting of metals below sodium in the electromotive series, calcium, ammonium, hydrogen and combinations of such ions with one another.

A preferred embodiment of the invention resides in the preparation and use of catalysts in which the aforementioned crystalline aluminosilicate is a Y-type zeolite.

It has theretofore been reported that various chemical reactions may be advantageously carried out by contact catalysis using as catalyst, crystalline metal aluminosilicate zeolites having rigid three-dimensional networks made up of unit cells characterized by the substantial absence of change in unit cell dimensions upon dehydration and rehydration and a homogeneous highly uniform pore structure. The above requirements are fulfilled by certain crystalline zeolites known as molecular sieves. The reactions effectively catalyzed by such materials include, by way of example, hydrocarbon cracking, alkylation, dealkylation, disproportionation, isomerization and polymerization. The ability of the above catalysts to influence and direct the course of chemical conversion entails an unusual degree of desirable catalytic selectivity. Briefly, two types of selectivity are involved; first, geometrical selectivity which depends on the relationship of the diameter of the pores in the crystal structure of the aluminosilicate zeolite and the diameter of the reactant and product molecules and second, intrinsic catalytic selectivity which depends on the choice of cation present on the internal surfaces of the crystalline metal aluminosilicate salt.

A wide variety of zeolites of both natural and synthetic origin are known including, for example, chabazite, gmelinite, mesolite, mordenite, natrolite, sodalite, scapolite, lazurite, leucrite and cancrinite. Synthetic zeolites may be of the A-type, X-type, Y-type or other well known forms of molecular sieve. Preparation of the above synthetic zeolites has been described in the literature, for example A-type zeolite in U.S. 2,882,243; X-type zeolite in U.S. 2,882,244 and Y-type zeolite in Belgium Patents Nos. 577,642 and 598,582. As initially prepared, the metal of the aluminosilicate is an alkali metal and usually sodium. Such alkali metal is subject to base exchange with a wide variety of other metal ions. The melecular sieve materials so obtained are unusually porous, the pores having highly uniform molecular dimensions generally between about 3 and about 15 Angstrom units in diameter. Each crystal of molecular sieve material contains an exceedingly large number of tiny cavities or cages interconnected by channels of unvarying diameter. The size and portion of the metal ions in the crystal control the effective diameter of the interconnecting channels.

In accordance with the present invention, it has been discovered that a highly active and selective catalyst for the conversion of organic compounds is obtained by substantial replacement of the alkali metal ions of an alkali metal crystalline aluminosilicate having a silica to alumina mole ratio in excess of 3, and preferably an alkali metal Y-type crystalline aluminosilicate, with ions of at least one member selected from the group consisting of metals below sodium in the electromotive series, calcium, ammonium, hydrogen and combinations of such ions with one another. Particularly preferred replacing ions include those of the alkaline earth metals, rare earth metals, manganese, ammonium and combinations of such ions with one another. The crystalline aluminosilicate, either before or after the indicated ion exchange, is intimately admixed in finely divided form with a binder therefor under conditions such that the aluminosilicate is distributed throughout and held suspended in a matrix of the binder. In those instances where the alkali metal aluminosilicate is initially mixed with the binder, ion exchange of the resulting composite is subsequently carried out to effect replacement of the alkali metal ions with one or more ions of the group referred to hereinabove. The catalyst so obtained has unexpectedly been found to have a greater activity and an improved selectivity over comparable catalysts prepared from other synthetic aluminosilicates such as those of the X-type wherein the mole ratio of silica to alumina is below 3.

The catalyst of the present invention in contrast to previous conventional cracking catalyst is produced from a crystalline aluminosilicate of the Y-type having a structure of rigid three-dimensional networks characterized by uniform pores between 6 and 15 Angstroms in diameter and in which substantially all of the original alkali metal has been replaced with a member selected from the group consisting of metals below sodium in the electromotive series, calcium, ammonium, hydrogen and combinations of such ions with one another. The uniform pore openings within the aforementioned range occur in all dimensions and permit easy access to the catalyst surface of all hydrocarbon reactant molecules and afford ready release of the product molecules. The catalyst further unexpectedly possesses unusual stability when in the form of a hydrogen or acid Y aluminosilicate which has been exchanged into a hydrous oxide matrix. The high stability of such catalyst is attributable to an apparent synergistic action between the acid aluminosilicate and the confining hydrous oxide matrix.

In one embodiment, the present invention provides a method for preparing a unique catalytic composition by intimately combining with a suitable binder, finely divided crystalline aluminosilicate of the Y-type, the cation of which is selected from at least one member of the group consisting of metals below sodium in the electromotive series, calcium, ammonium, hydrogen and combinations of such ions with one another, the resulting composite after drying and calcining having an exchangeable alkali metal content of less than 3 percent by weight.

In another embodiment, the present invention provides a method for preparing a unique cracking catalyst by effecting dispersion in a suitable matrix of a finely divided Y-aluminosilicate in which at least 70 percent of the original alkali metal content thereof has been replaced with ions of at least one member selected from the group consisting of metals below sodium in the electromotive series, calcium, ammonium, hydrogen and combinations of such ions with one another, said aluminosilicate having uniform pore openings between about 6 and about 15 Angstrom units, drying, calcining and treating the resulting composite with steam at a temperature between about 400 and about 1450° F. for a period in excess of about 2 hours.

In another embodiment, the present invention affords a method for preparing a hydrocarbon conversion catalyst by dispersing in an organic oxide sol a finely divided Y-aluminosilicate resulting from substantially complete base exchange of the alkali metal content of crystalline Y alkali metal aluminosilicate having uniform pore openings between 6 and 15 Angstrom units with a solution containing ions of at least one member selected from the group consisting of metals below sodium in the electromotive series, calcium, ammonium, hydrogen and combinations of such ions with one another, effecting gelation of the sol containing finely divided aluminosilicate, washing the resulting composite free of soluble matter, drying, calcining and treating the calcined composite with steam.

In another embodiment, the present invention provides a catalytic composite comprising a Y-crystalline aluminosilicate, suspended in and distributed throughout a matrix, the cation of said aluminosilicate being at least one member of the group consisting of metals below sodium in the electromotive series, calcium, ammonium, hydrogen and combinations of such ions with one another.

In still another embodiment, the present invention provides a cracking catalyst having exceptional activity and selectivity consisting essentially of 1 to 90 percent by weight of a Y-crystalline aluminosilicate, the original alkali metal ions of which have been substantially completely replaced by ions of at least one member selected from the group consisting of metals below sodium in the electromotive series, calcium, ammonium, hydrogen and combinations of such ions with one another, said aluminosilicate having a weight mean particle diameter of less than 40 microns and preferably less than 15 microns, suspended in and distributed throughout a hydrous oxide matrix selected from the group consisting of clays and inorganic oxide gels.

In yet another embodiment of the invention, there is provided a catalytic composition comprising spheroidal particles consisting essentially of 1 to 50 percent by weight of a Y crystalline aluminosilicate, the original alkali metal ions of which have been substantially completely replaced with ions of at least one member selected from the group consisting of metals below sodium in the electromotive series, calcium, ammonium, hydrogen and combinations of such ions with one another, said aluminosilicate having a weight mean particle diameter of between 2 and 7 microns suspended in and distributed throughout a matrix of an inorganic oxide gel selected from the group consisting of alumina, silica and composites of silica and an oxide of at least one metal selected from the group consisting of metals of Groups II–A, III–B and IV–A of the Periodic Table.

A still further embodiment of the invention resides in a process for catalytically converting organic compounds and particularly for the catalytic cracking of hydrocarbon oils in the presence of the above catalyst in accordance with which an enhanced conversion of the charge stock to useful products is realized.

The crystalline aluminosilicates employed in preparation of the instant catalyst are those known in the art as Y-zeolites. The latter are particularly described and may be suitably prepared by the procedure described in Belgium Patents 577,642 and 598,582. The molar composition of such zeolites falls within the general formula:

$$0.9 \pm 0.2 Na_2O : Al_2O_3 : 3-6.5 SiO_2 \cdot 9H_2O$$

The above zeolite used in preparation of the present catalyst has a uniform pore structure comprising openings characterized by an effective pore diameter of between 6 and 15 Angstroms.

The catalysts utilized in the present process are prepared by base exchange of the above crystalline alkali metal Y-aluminosilicate with ions of at least one member selected from the group consisting of metals below sodium in the electromotive series, calcium, ammonium, hydrogen and combinations of such ions with one another to replace at least 70 and preferably more than 80 percent of the original alkali metal ions with ions of the aforementioned group. As utilized herein, the electromotive series is that defined in the Handbook of Chemistry and Physics, 43rd edition, published by Chemical Rubber Publishing Company. The catalysts of the present invention may be prepared by intimately admixing a crystalline alkali metal Y-aluminosilicate such as described hereinabove having a structure of rigid three-dimensional networks characterized by a uniform effective pore diameter between 6 and 15 Angstrom units in finely divided form, generally having a weight mean particle diameter of less than about 40 microns and preferably less than about 15 microns, with a suitable binder such as metal powder, clay or an inorganic oxide gel, base exchanging the resulting composite substantially free of alkali metal by treating with a solution containing ions of at least one member selected from the group consisting of metals below sodium in the electromotive series, calcium, ammonium, hydrogen and combinations of such ions with one another and washing, drying and calcining the resulting composite. Alternatively, and preferably, the crystalline alkali metal Y-aluminosilicate may undergo base exchange as above prior to intimate admixture thereof with the binder. In accordance with such manner of operation, the resulting mixture of finely divided previously base exchanged aluminosilicate distributed throughout and held suspended in a matrix of the binder is washed, base-exchanged, if necessary, to remove zeolitic alkali metal from the binder, dried and calcined as described hereinabove. The exchangeable alkali metal content of the resulting catalytic composites obtained by the foregoing procedures is generally below 3 percent and preferably less than 2 percent by weight.

Intimate admixture of the finely divided aluminosilicate and binder, such as metal powder, clay or inorganic oxide hydrogel, may be accomplished for example by ball milling the two materials together over an extended period of time, preferably in the presence of water under conditions to reduce the particle size of the aluminosilicate to a weight mean particle diameter of less than 40 and preferably less than 15 microns. Such method of admixture, however, is less preferred than that achieved by dispersing the aluminosilicate in finely divided form in an inorganic hydrous oxide such as a hydrosol or hydrogel. Following this procedure, the finely divided aluminosilicate may be dispersed in an already prepared hydrogel or hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. As noted hereinabove, it is desirable that the aluminosilicate introduced into the hydrosol have a weight mean particle diameter of less than about 40 microns and preferably less than 15 microns and when large particles are desired, between 2 and 7 microns. The use of aluminosilicate having a weight mean particle diameter in excess of 40 microns was found to give rise to a physically weak product while the use of aluminosilicate having a weight mean particle diameter of less than 1 micron produced a product of low diffusivity.

The powder-containing inorganic oxide hydrosol sets to a hydrogel after lapse of a suitable period of time and the resulting hydrogel is base exchanged, if zeolitic alkali metal has been introduced as a result of employing an alkali metal silicate and is thereafter washed, dried to a gel and thermally activated at a temperature below the fusion point of the incorporated aluminosilicate powder. It has been found that the resulting product consisting essentially of Y-type aluminosilicate, the cation of which is selected from the group consisting of metals below sodium in the electromotive series, calcium, ammonium, hydrogen and combinations of such ions with one another, suspended in and distributed throughout a matrix of inorganic oxide gel, possesses unique properties as a hydrocarbon conversion catalyst.

In addition to the above described Y-type aluminosilicate, it has been found desirable, in some instances, to include in the catalyst matrix, along with the finely divided Y-type aluminosilicate, a secondary solid additive also in finely divided form, generally in the particle size range of 1 to 40 microns weight mean particle diameter, capable of imparting increased diffusivity to the resulting composition. Such additive material may be inert or may contribute to the overall catalytic activity of the final catalyst composite. The amount of such additive may extend up to 40 percent by weight of the composition. Generally, when the catalyst is in the form of gel beads, the weight mean particle diameter of the additive material is less than 10 microns. Suitable additives for the above purpose include, by way of example, clay, alumina, zircon, barytes, carbon, wood flour, silica, recycle catalyst fines, magnesia, spent cracking catalyst fines and various ores and naturally occurring minerals. These additives may be retained in the final composition or in the case of combustible materials, such as carbon or wood flour, may have previously been removed as a result of exposing the catalyst either through subsequent preparational treatment or during use to an elevated temperature.

The binder constituting the matrix of the present catalyst should be thermally stable under the conditions at which the conversion reaction is carried out. Thus, it is contemplated that solid porous adsorbents, carriers and supports of the type heretofore employed in catalytic operations may feasibly be used in combination with the crystalline Y-type aluminosilicate above described. Such materials may be catalytically inert or may possess an intrinsic catalytic activity or an activity attributable to close association or reaction with the crystalline Y-type aluminosilicate. Such materials include, by way of example, dried inorganic oxide gels and gelatinous precipitates of alumina, silica, zirconia, magnesia, hafnia, thoria, titania, boria and combinations of these oxides with one another and with other components. Other suitable binding materials include activated metal powders, charcoal, mullite, kieselguhr, activated carbon, bauxite, silicon carbide, sintered alumina, and various clays. Preferably, the aluminosilicate is intimately composited with a hydrous oxide material such as an inorganic oxide hydrogel or clay as described above.

While inorganic oxide gels generally may be utilized as a suitable matrix, it is preferred that the inorganic oxide gel employed be a cogel of silica and an oxide of at least one metal selected from the group consisting of metals of Groups II–A, III–B and IV–A of the Periodic Table. Such components include, for example, silica-alumina, silica-magnesia, silica-zirconia, silica-hafnia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and oxides of the metals are present in minor proportion. Thus, the silica content of such gels is generally within the approximate range of 55–100 weight percent with the metal oxide content ranging from 0–45 weight percent. The inorganic oxide hydrosols utilized herein and hydrogels obtained therefrom may be prepared by any method well known in the art such as, for example, hydrolysis of ethyl ortho silicate, acidification of an alkali metal silicate which may contain a compound of a metal, the oxide of which it is desired to cogel with silica, etc. The relative proportions of finely divided crystalline aluminosilicate and matrix may vary widely with the crystalline aluminosilicate content ranging from about 1 to 90 percent by weight and more usually, particularly where the composite is prepared in the form of beads, in the range of about 1 to about 50 percent by weight of the composite.

The catalyst of this invention may be prepared in any desired physical form. Preferably, it is used in the form of small fragments of a size best suited for operation under the specific conditions existing. Thus, the catalyst may be in the form of finely divided powder or may be in the form of pellets of $\frac{1}{16}''$ to $\frac{1}{8}''$ size, for example, obtained upon pelleting, casting or extruding in accordance with well known techniques. A hydrosol containing added crystalline aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the aluminosilicate-containing hydrogel. Also, the hydrogel may be introduced into the perforations of a perforated plate and retained therein until the sol has set to a hydrogel, after which the formed hydrogel pieces are removed from the plate. A particularly feasible method is to prepare the catalyst in the form of spheroidal particles by dispersing the powder aluminosilicate in a hydrosol and introducing globules of the resulting hydrosol into a body of water-immiscible liquid, for example an oil medium, wherein the globules of hydrosol set to a hydrogel and subsequently pass into an underlying layer of water from which they are sluiced to further processing operations such as base exchange, water-washing, drying, and calcining. Larger size spheres are ordinarily within the range of from about $\frac{1}{64}''$ to about $\frac{1}{4}''$ in diameter, whereas smaller size spheres, which are generally referred to as microspheres and formed by spray drying or other well developed techniques, are within the range of from about 20 to about 300 microns in diameter. The use of the spheroidally shaped particles is of particular advantage in hydrocarbon conversion processes in which the catalyst is subjected to continuous movement such as the compact moving bed process, the fluidized process, etc. As applied to the stationary bed, spheroidal catalyst particles provide effective contact between the reactants and the catalyst by avoiding channeling.

While for the production of spheroidal catalyst particles by the aforementioned technique, initial formation of a hydrosol which sets upon lapse of a short interval of time to an all-embracing bead-form hydrogel is essential, it is also feasible to employ particularly where the catalyst is prepared in a form other than the spheroidal shape, a matrix comprising a gelatinous hydroxide precipitate with varying degrees of hydration or a mixture of a hydrogel and such gelatinous precipitate. The term "gel" as utilized herein is intended to include hydrogel, gelatinous precipitates, and mixtures of the two. Also, the matrix may consist of or contain as a component thereof a clay and particularly a clay of the montmorillonite or kaolinite families either raw or acid treated.

Another class of suitable matrix materials include powdered metals not susceptible to oxidation under the reaction conditions encountered. Suitable metal powders include, by way of example, aluminum; iron-containing alloys, such as stainless steel and various other metals characterized by stability under the conditions of operation. Other suitable materials for use as the matrix of the present catalyst composition include charcoal, graphite, bauxite, and other binders compatible with the crystalline metal aluminosilicate and thermally stable under the temperature conditions at which the catalyst is used.

As indicated hereinabove, crystalline alkali metal Y-aluminosilicate undergoes base exchange with ions of at least one member selected from the group consisting of metals below sodium in the electromotive series, calcium, ammonium, hydrogen and combinations of such ions with one another. Representative of the aforementioned metals are manganese, the alkaline earth metals, such as calcium and magnesium; the rare earth metals, such as cerium, praseodymium, lanthanum, neodymium, samarium, gadolinium and mixtures thereof. Base exchange is carried out to replace at least 70 and preferably more than 80 percent of the original alkali metal ions with ions of the abovementioned group and to reduce the exchangeable alkali metal content of the finished catalyst to below 3 percent. The aluminosilicate in finely divided form and bound together in the form of aggregate particles with a suitable binder or matrix material may be base exchanged either before or after intimate admixture with the binding material. Base exchange is effected by treatment with a solution containing ions which it is desired to introduce into the aluminosilicate. It is contemplated that any ionizable compound furnishing ions of hydrogen, ammonium or the aforementioned metals may be employed for base exchange. Generally, an aqueous solution of such compounds will be employed. A particularly effective base exchange solution is one containing one or more metals below sodium in the electromotive series and ammonium ions, including complex ammonium ions, wherein the ratio of metal to ammonium ions is between 10/1 and 1/100 to effect replacement of the alkali metal ion with the aforesaid metal and ammonium ions. The exchangeable alkali metal content of the finished catalyst should be less than about 3 and preferably less than about 2 percent by weight. The base exchange solution may be contacted with the crystalline aluminosilicate in the form of a fine powder, a compressed pellet, extruded pellet, spheroidal bead or other suitable particle shape. It has been found that the desired base exchange may be effected most readily if the alkali metal aluminosilicate undergoing treatment has not previously been subjected to a temperature above about 600° F.

The temperature at which base exchange is effected may vary widely, generally ranging from room temperature to an elevated temperature below the boiling point of the treating solution. While the volume of base exchange solution employed may vary widely, generally an excess is employed and such excess is removed from contact with the crystalline aluminosilicate after a suitable period of contact. The time of contact between the base exchange solution and crystalline aluminosilicate in any instance in successive contacts is such as to effect replacement of the alkali metal ions thereof to an extent such that the exchangeable alkali metal content of the finished catalytic composite is less than 3 percent by weight. It will be appreciated that such period of contact may vary widely depending on the temperature of the solution and the particular compound employed for base exchange. Thus, the time of contact may extend from a brief period of the order of a few hours for small particles to longer periods of the order of days for large pellets.

After base exchange treatment, the product is removed from the treating solution. Anions introduced as a result of treating with the base exchange solution may, if desired or necessary, be removed by washing the treated composite for such period of time until the same is free of said anions. The washed product is then dried generally in air to remove substantially all of the water therefrom. While drying may be effected at ambient temperature, it is more satisfactory to facilitate removal of moisture by maintaining the product at a temperature between about 150 and about 600° F. for 4 to 48 hours.

The dried material can then be subjected to calcination by heating in an inert atmosphere, i.e., one which does not adversely affect the catalyst such as air, nitrogen, hydrogen, flue gas, helium or other inert gas. Generally, the dried material is heated in air to a temperature in the approximate range of 500° F. to 1500° F. for a period of at least about 1 hour and usually between 1 and 48 hours.

It has further been found that the catalyst selectivity of the above-described composition is greatly improved by subjecting the same to a mild steam treatment. Exposure of the catalyst to steam is a highly desirable step in obtaining a product capable of affording an enhanced yield of gasoline. Steam treatment may be carried out at a temperature within the approximate range of 400 to 1450° F. for at least about 2 hours. Usually steam at a temperature of about 1000° F. to 1400° F. will be used with the treating period extending from about 2 to about 100 hours. Also, an atmosphere consisting of a substantial amount of steam, say at least about 5 percent by volume but containing air or other gas substantially inert with respect to the composite being treated may be used and such mixtures may, in some instances, be desirable with the use of the more elevated temperatures to avoid possible deactivation of the catalyst. Steam treatment may be effected at pressures from atmospheric up to about 500 p.s.i.g. The above-noted steam treatment serves to reduce the surface area of the calcined composite. Thus, it is particularly preferred to subject the above described calcined catalytic composition to treatment with steam to reduce the surface area thereof by at least about 20 percent but not in excess of about 75 percent.

The reactions catalyzed by the crystalline aluminosilicate compositions described herein include the transformation of organic compounds catalytically convertible in the presence of acidic catalyst sites. Typical of such reactions are cracking of paraffinic, olefinic and aromatic and naphthenic hydrocarbons as well as mixtures thereof, for example petroleum fractions, such as those boiling in the gas-oil range; disproportionation of aromatics; dehydration of alcohols to olefins and ethers; hydration of olefins to alcohols, isomerization and polymerization of olefins, isomerization of terpenes; alkylation of isoparaffins and alkylation and dealkylation of aromatic hydrocarbons.

The cracking of hydrocarbons represent an especially advantageous use of the aluminosilicate catalyst described herein since the nature of the products may be well controlled. The catalyst in such process may be used as pellets in a fixed bed operation or they may be used in a compact moving bed operation or in a fluidized operation. The general operating conditions cover a wide range because of the wide utility of the catalysts. It is generally desirable to carry out such processes at a temperature within the approximate range of 500–1200° F. and a pressure ranging from subatmospheric up to several hundred atmospheres. The contact time of the oil within the catalyst is adjusted in any case according to the conditions, the particular oil feed and the particular results desired to give a substantial amount of cracking to lower boiling products.

The cracking activity of the catalyst is a measure of its capacity to catalyze various conversions of hydrocarbons and is expressed herein as the percentage conversion of a Mid-Continent Gas Oil having a boiling range of 450–950° F. to gasoline having an end boiling point of 410° F. by passing vapors of the said gas oil through the catalyst at 875° F. to 900° F., substantially atmospheric pressure and a feed rate of 1.5–16 volumes of liquid oil per volume of catalyst per hour for 10 minute runs between regenerations.

It has ben found desirable in analyzing the results obtained with the catalysts described herein to compare the same with those realized with a conventional commercial silica-alumina gel cracking catalyst containing approximately 10 weight percent alumina. The exceptional activity, stability, and selectivity of the present catalyst is emphasized by comparison of the various product yields obtained with such catalyst with yields of the same products given by the conventional silica-alumina catalyst at the same conversion level. The differences (Δ values) shown hereinafter represent the yields given by the present catalyst minus the yields given by the conventional catalyst.

The following examples will serve to illustrate the invention described hereinabove without limiting the same:

EXAMPLE 1

Crystalline sodium aluminosilicate of the Y-type was prepared from the following reactants.

A. Silica solution: 1551 cc. (1870 grams) of colloidal silica containing 0.361 gram $SiO_2$/cc.
B. Sodium aluminate solution:
   75 grams $NaAlO_2$ (41.7% wt. $Al_2O_3$, 30% wt. $Na_2O$)
   330 grams NaOH (77.5% wt. $H_2O$)
   1345 cc. $H_2O$ The above solutions were mixed at a temperature of about 80° F. by pouring solution B into solution A. The resulting mixture was agitated vigorously for approximately one half hour. The slurry, so obtained, was then heat treated at a temperature of about 200° F. for 42 hours. The solid material present was thereafter separated from the supernatant liquid by filtration. The filter cake obtained was washed with one volume of water per volume of initial slurry to remove the free caustic.

The composition of this example was prepared by dispersing 10 percent by weight of the Y-zeolite, prepared as described above, in a matrix of silica-alumina gel containing about 94 weight percent silica and 6 weight percent alumina.

The following reactants were employed.

C. Silicate slurry solution:

(1)

10.44 lbs. N-brand sodium silicate (28.5 wt. percent $SiO_2$, 8.9 wt. percent $Na_2O$, 62.6 wt. percent $H_2O$)
5.26 lbs. water (2)

4.94 lbs. water
0.66 lb. sodium Y-aluminosilicate (54.3 wt. percent solids)

Solution 2 was added to solution 1 with vigorous agitation to yield a resulting solution having a specific gravity of 1.182 at 61° F.

D. Acid solution:
   57.10 lbs. water
   4.23 lbs. $Al_2(SO_4)_3 \cdot 18H_2O$
   1.98 lbs. $H_2SO_4$ (97 percent)
   Specific gravity at 77° F=1.056

The above solutions were passed through a mixing nozzle at the rate of 394 cc. per minute of solution D to 374 cc. per minute of solution C. The resulting hydrosol having a pH of 8.5 was introduced in the form of globules into a body of oil wherein it set to beads of hydrogel in 2.2 seconds at a temperature of 62° F.

The bead hydrogel was base exchanged with an aqueous solution of 2 weight percent rare earth chloride having the following composition: 0.63 percent cerium chloride, 0.33 percent lanthanum chloride, 0.06 percent praseodymium chloride, 0.23 percent neodymium chloride and traces of samarium chloride, gadolinium chloride and other rare earth metal chlorides. Base exchange was carried out using 12 contacts (9 contacts of 2 hours each and 3 contacts of 20 hours each) with ½ volume of solution per volume of hydrogel beads. The exchanged hydrogel was washed free of soluble anions, dried for 24 hours in air at 270° F., tempered in air for 10 hours at 1000° F. and treated with steam at 15 p.s.i.g. and 1200° F. both for 30 hours and for 60 hours.

The finished composition contained 0.21 weight percent sodium and had a rare earth metal oxide content of 10.8 weight percent. The surface area of the 30 hour steam treated product was 195 m.$^2$/g. and for the 60 hour steam treated product 167 m.$^2$/g.

EXAMPLE 2

The composition of this example was prepared in the same manner as that for Example 1 except that base exchange of the bead hydrogel was carried out in two steps.

Initially, the bead hydrogel was base exchanged by contact with a 2 weight percent aqueous solution of the hereinabove described rare earth metal chloride solution for 16 hours, using ½ volume of solution per volume of bead hydrogel. Thereafter, the bead hydrogel was contacted with a 1 weight percent ammonium chloride solution of a 24 hour continuous exchange equivalent to 12 two-hour contacts with ½ volume of solution per volume of hydrogel.

The base exchanged hydrogel was then washed, dried and tempered in the same manner as in Example 1 and thereafter treated with steam at 15 p.s.i.g. and 1200° F. both for 24 hours and for 48 hours.

The finished composition contained 0.2 weight percent sodium and had a rare earth metal oxide content of 4.79 weight percent. The surface area of the 24 hour steam treated product was 176 m.$^2$/g. and for the 48 hour steam treated product 155 m.$^2$/g.

EXAMPLE 3

The composition of this example was prepared in a manner identical with that of Example 2 except that the rare earth metal chloride treating solution was lanthanum chloride, $LaCl_3 \cdot 6H_2O$.

The finished composition contained 0.2 weight percent sodium and had a lanthanum oxide content of 5.14 weight percent. The surface area of the 24 hour steam treated product was 186 m.$^2$/g. and for the 48 hour steam treated product 161 m.$^2$/g.

EXAMPLE 4

The composition of this example was prepared in a manner essentially the same as that of Example 2 except that initially the bead hydrogel was base exchanged with a 2 weight percent aqueous solution of cerium-free rare earth metal chloride (didymium chloride) for 16 hours, using ½ volume of solution per volume of bead hydrogel. The hydrogel was then base exchanged continuously with a 1 weight percent ammonium chloride solution for a 24 hour continuous exchange equivalent to 12 two-hour contacts with ½ volume of solution per volume of hydrogel.

The base exchanged hydrogel was then washed, dried and tempered in the same manner as in Example 1 and thereafter treated with steam at 15 p.s.i.g. and 1200° F. for 24 hours.

The finished composition contained 0.4 weight percent sodium and a rare earth metal oxide content of 5.83 weight percent. The surface area of the 24 hour steam treated product was 176 m.$^2$/g.

EXAMPLE 5

The composition of this example was prepared in a manner essentially the same as that of Example 1 except that the bead hydrogel was base exchanged continuously for 48 hours with a 2 weight percent aqueous solution of $MnCl_2$. The total solution used was equivalent to 24 two-hour charges using ½ volume of solution per volume of hydrogel.

The hydrogel was then washed, dried and tempered in the same manner as in Example 1 and thereafter treated with steam at 15 p.s.i.g. and 1200° F. for 24 hours.

The finished composition contained 0.33 weight percent sodium and 5.34 weight percent manganese. The surface area of the steam treated product was 173 m.$^2$/g.

EXAMPLE 6

The composition of this example was prepared in a manner essentially the same as that of Example 1 except that the bead hydrogel was base exchanged continuously for 48 hours with a 2 weight percent aqueous solution of $MgCl_2$. The total solution used was equivalent to 24 two-hour charges using ½ volume of solution per volume of hydrogel.

The hydrogel was then washed, dried, tempered and steam treated as in the preceding example.

The finished composition contained 0.35 weight percent sodium and 2.32 weight percent magnesium. The surface area of the steam treated product was 212 m.²/g.

The compositions of Examples 1–6 were tested for catalytic cracking activity in the manner described hereinabove and the results obtained are shown in Table I below:

contacts of two hours each with ½ volume of solution per volume of hydrogel. The exchanged hydrogel was then washed, dried and tempered as in Example 1. The composition of Example 7 was steam treated for 30 hours at 15 p.s.i.g. and 1200° F., while the composition of Example 8 was steam treated for 24 hours under the indicated conditions.

EXAMPLE 9

The composition of this example was prepared by base exchanging 200 grams of the Y-zeolite, prepared as in Example 1, with a 5 weight percent aqueous solution of ammonium chloride. Base exchange was carried out at 180° F. using 12 contacts of two hours each with ½ vol-

TABLE I

| Example Number | 1 | 2 | 3 | 4 | 5 | 6 |
|---|---|---|---|---|---|---|
| Description: Matrix | Si/Al(94/6) | Si/Al(94/6) | Si/Al(94/6) | Si/Al(94/6) | | |
| Fines: Type | Na/Al/Si(13Y) | Na/Al/Si(13Y) | Na/Al/Si(13Y) | Na/Al/Si(13Y) | | |
| Conc. | 10 | 10 | 10 | 10 | | |
| Base Exchange: Solution | $RECl_3 \cdot 6H_2O$ | $RECl_3 \cdot 6H_2O + NH_4Cl$ | $LaCl_3 6H_2O + NH_4Cl$ | $DiCl_3 \cdot 6H_2O + NH_4Cl$ | $MnCl_2$ | $MgCl_2$ |
| Conc., Wt. Percent | 2 | 2    1 | 2    1 | 2    1 | 2 | 2 |
| Composition: Na, Wt. Percent | 0.21 | 0.2 | 0.2 | 0.4 | 0.33 | 0.35 |
| $(RE)_2O_3$, Wt. Percent | 10.8 | 4.79 | 5.14 | 5.83 | 5.34 Mn | 2.32 Mg |
| Physical Properties: Surface Area, m.²/g. (Steamed) | ¹195   ²167 | ³176   ⁴155 | ³186   ⁴161 | ³176 | ³173 | ³212 |
| Catalytic Evaluation: | | | | | | |
| Conversion, Vol. Percent | 63.0   60.8 | 67.1   62.0 | 68.3   66.0 | 65.7 | 48.5 | 52.6 |
| LHSV | 4   4 | 4   4 | 4   4 | 4 | 4 | 4 |
| 10 RVP Gaso., Vol. Percent | 55.2   53.7 | 58.2   54.9 | 59.4   58.1 | 57.0 | 41.9 | 46.6 |
| Excess $C_4$'s, Vol. Percent | 10.2   10.8 | 12.1   11.2 | 12.3   11.1 | 11.8 | 8.0 | 8.0 |
| $C_5+$ Gasoline, Vol. Percent | 52.5   51.1 | 55.6   52.3 | 56.6   55.3 | 54.2 | 39.9 | 44.2 |
| Total $C_4$'s, Vol. Percent | 12.9   13.3 | 14.8   13.8 | 15.1   13.9 | 14.6 | 10.0 | 10.4 |
| Dry Gas, Wt. Percent | 6.4   5.1 | 6.7   5.7 | 6.9   6.7 | 6.6 | 4.8 | 5.4 |
| Coke, Wt. Percent | 2.4   2.3 | 2.0   1.7 | 2.0   1.6 | 1.9 | 2.1 | 1.3 |
| Advantage Over Std. Cracking Catalyst:* | | | | | | |
| 10 RVP, Vol. Percent | +8.8   +8.5 | +10.0   +9.0 | +10.6   +10.3 | +9.4 | +3.2 | +5.6 |
| Excess $C_4$'s, Vol. Percent | −4.8   −2.9 | −4.6   −3.4 | −4.9   −5.0 | −4.2 | −2.0 | −3.4 |
| $C_5+$ Gasoline, Vol. Percent | +8.4   +8.5 | +9.4   +8.6 | +9.8   +9.7 | +8.8 | +3.5 | +5.4 |
| Total $C_4$'s, Vol. Percent | −4.2   −3.2 | −3.9   −2.9 | −4.1   −4.3 | −3.4 | −2.4 | −3.2 |
| Dry Gas, Wt. Percent | −1.8   −2.6 | −2.3   −2.3 | −2.3   −1.0 | −2.0 | −0.9 | −1.4 |
| Coke, Wt. Percent | −2.7   −2.5 | −3.8   −3.2 | −4.6   −4.0 | −3.7 | −0.5 | −2.0 |
| $C_5+$ Gasoline Yield Advantage over $SiO_2/Al_2O_3$—REHX** | +2.2   +2.4 | +3.3   +2.4 | +3.8   +3.5 | +2.8 | | |

¹ Treated 30 hours at 1,200° F. and 15 p.s.i.g. with 100% steam.
² Treated 60 hours at 1,200° F. and 15 p.s.i.g. with 100% steam.
³ Treated 24 hours at 1,200° F. and 15 p.s.i.g. with 100% steam.
⁴ Treated 48 hours at 1,200° F. and 15 p.s.i.g. with 100% steam.

*Commercial silica-alumina catalyst containing approximately 90% $SiO_2$ and 10% $Al_2O_3$.
**13X zeolite base exchanged with rare earth-ammonium chloride and contained in matrix of $SiO_2$-$Al_2O_3$ gel.

As will be seen, the data for the catalysts of Examples 1–6 are compared with the results obtained utilizing a commercial silica-alumina cracking catalyst at the same conversion and also with a catalyst consisting of 10 weight percent of sodium X-type aluminosilicate dispersed in a gel matrix of 94 weight percent silica and 6 weight percent alumina and base exchanged with combined rare earth metal and ammonium chloride solutions to a low residual sodium content.

The data of Table I demonstrate the catalytic advantages of the exchanged Y-type aluminosilicate contained in a matrix over the comparable X-type aluminosilicate, as well as the very marked improvement in activity and selectivity in comparison to the standard commercial silica-alumina catalyst.

EXAMPLES 7–8

The compositions of these examples were prepared in the same manner as that for Example 1 except that base exchange of the bead hydrogel was carried out with ammonium chloride solution.

Thus, exchange of the bead hydrogel for both of these examples was effected by contact with an aqueous solution of 1 weight percent ammonium chloride using 12 ume of solution per volume of slurry. The exchanged material was washed, dried and tempered as in Example 1 and thereafter treated with steam at atmospheric pressure for 20 hours at 1225° F.

The composition so obtained had a sodium content of 1.19 weight percent, an alumina content of 27.0 weight percent and a surface area of 66 m.²/gram.

EXAMPLE 10

The composition of this example was prepared in the same manner as that for Example 7 except that the sodium aluminosilicate was of the X-type and present in an amount corresponding to 25 percent by weight.

Base exchange of the hydrogel beads in this example was carried out by contact with an aqueous solution of 2 weight percent ammonium chloride at room temperature using 8 contacts of two hours each with ½ volume of solution per volume of hydrogel beads. The exchanged hydrogel was then washed free of chloride, dried in air at 230° F., tempered in air at 1000° F. for 10 hours and treated with steam at 15 p.s.i.g. for 24 hours at 1200° F.

The composition of Examples 7–10 were tested for catalytic cracking activity in the manner described hereinabove and the results are shown below in Table II:

TABLE II

| Example Number | 7 | | 8 | | 9 | 10 |
|---|---|---|---|---|---|---|
| Description: | | | | | | |
| Matrix | Si/Al/Si(94/6) | | Si/Al(94/6) | | | Si/Al/Si(94/6) |
| Fines: | | | | | | |
| Type | Na/Al/Si(13Y) | | Na/Al/Si(13Y) | | Na/Al/Si(13Y) | Na/Al/Si(13X) |
| Conc | 10 | | 10 | | 100 | 25 |
| Base Exchange: | | | | | | |
| Solution | NH₄Cl | | NH₄Cl | | NH₄Cl | NH₄Cl |
| Conc., Wt. Percent | 1 | | 1 | | 5 | 2 |
| Composition: | | | | | | |
| Na, Wt. Percent | 0.27 | | 0.3 | | 1.19 | 1.09 |
| Al₂O₃, Wt. Percent | 8.1 | | | | 27.0 | 13.6 |
| Physical Properties: | | | | | | |
| App. Dens., g./cc | 0.86 | | 0.82 | | 0.66 | 0.81 |
| Surface Area, m.²/g. (Steamed) | 137 | | 136 | | 66 | |
| Catalytic Evaluation: | | | | | | |
| Conversion, Vol. Percent | 43.2 | 60.3 | 51.3 | 43.3 | 61.9 | 53.2 | 30.0 |
| LHSV | 4 | 2 | 3 | 4 | 2 | 4 | 4 |
| 10 RVP Gaso., Vol. Percent | 38.3 | 49.4 | 43.7 | 37.9 | 50.7 | 47.2 | 27.5 |
| Excess C₄'s, Vol. Percent | 7.6 | 12.7 | 10.5 | 7.5 | 13.1 | 9.3 | 4.2 |
| C₅+ Gasoline, Vol. Percent | 36.3 | 47.1 | 41.7 | 36.0 | 48.5 | 44.7 | 25.8 |
| Total C₄'s, Vol. Percent | 9.6 | 14.9 | 12.4 | 9.4 | 15.4 | 11.8 | 5.8 |
| Dry Gas, Wt. Percent | 4.5 | 7.4 | 5.7 | 4.4 | 7.4 | 5.2 | 3.1 |
| Coke, Wt. Percent | 0.9 | 1.7 | 1.1 | 1.26 | 2.0 | 0.99 | 1.0 |
| Advantage Over Standard Cracking Catalyst:* | | | | | | | |
| 10 RVP, Vol. Percent | +2.5 | +4.3 | +3.4 | +2.1 | +4.9 | +5.9 | |
| Excess C₄'s, Vol. Percent | −0.9 | −1.1 | −0.5 | −1.1 | −1.4 | −2.2 | |
| C₅+ Gasoline, Vol. Percent | +2.8 | +4.3 | +3.7 | +2.5 | +4.9 | +5.7 | |
| Total C₄'s, Vol. Percent | −1.4 | −1.1 | −0.9 | −1.6 | −1.2 | −2.0 | |
| Dry Gas, Wt. Percent | −0.4 | −0.4 | −0.5 | −0.6 | −0.6 | −1.3 | |
| Coke, Wt. Percent | −1.0 | −3.0 | −2.2 | −0.7 | −2.8 | −2.4 | |

*Commercial silica-alumina cogel catalyst containing approximately 90% SiO₂ and 10% Al₂O₃.

The catalytic data summarized in the foregoing table show that the acid Y-aluminosilicates are active cracking catalysts possessing improved selectivity over the standard silica-alumina catalyst. In order to make a direct comparison of the catalysts of Examples 7 and 8 with the rare earth metal catalyst of Example 1, it was necessary to run the former under conversion conditions at a 2 liquid hourly space velocity. At 2 LHSV, the activities for the catalysts of Examples 7 and 8 were increased respectively to 60.3 and 61.9 volume percent conversion. These acidic catalysts demonstrate good selectivities at this conversion, the selectivity being improved at the expense of coke and dry gas with little loss of total C₄'s.

The data presented in Table II further point up the fact that the cataylst of Example 7 containing 10 weight percent of sodium Y-aluminosilicate approaches the activity of the pure material, i.e., the catalyst of Example 9, even though steam treated much more severely. Such data demonstrate that the incorporation of Y-type aluminosilicate into a silica-alumina matrix followed by base exchange with ammonium chloride solution leads to increased stability of the resulting acid aluminosilicate. While the reason for such unexpected increased stability is not known with certainty, it is believed to be attributable to synergism between the acid Y-type aluminosilicate and the matrix containing the same.

It will further be seen from the data of Table II that the catalyst of Example 10 prepared from crystalline aluminosilicate of the X-type was much less active than the catalyst of Example 12 which contained a smaller amount of crystalline aluminosilicate but of the Y-type.

The following examples serve to demonstrate that a hydrous alumina and a hydrous clay can be used as a matrix to prepare diluted rare earth Y-aluminosilicate catalysts having exceptional catalytic properties.

EXAMPLE 11

Crystalline sodium Y-aluminosilicate was prepared as in Example 1. Two hundred thirty (230) grams of the resulting aluminosilicate was base exchanged with a combined aqueous solution containing 5 weight percent of LaCl₃·6H₂O and 2 weight percent of NH₄Cl for 48 hours continuously using the equivalent of 24-two hour changes with one volume of solution per volume of slurry. The base exchanged material was washed free of soluble anions and dried.

Thirty (30) grams of the dried lanthanum exchanged powder was blended with 90 grams of hydrous alumina containing 66.5% solids at 1000° F. The blending was carried out in a blender with 150 cc. of added water to slurry the mixture to a homogeneous mass. The resulting mixture was dried at 230° F. in air for 24 hours, then pelleted and sized to 4 x 10 mesh size particles. The particles so obtained were calcined for 10 hours at 1000° F. and then steam treated at 1200° F. for 24 hours at 15 p.s.i.g.

The resulting composition had a sodium content of 0.3 weight percent, a La₂O₃ content of 4.25 weight percent and a surface area of 172 m.²/g. after steaming.

EXAMPLE 12

The composition of this example was prepared in the same manner as that of Example 11 except that the base exchange solution contained 5 weight percent of rare earth metal chloride (RECl₃·6H₂O) and 2 weight percent of ammonium chloride.

Twenty-two (22) grams of the dried rare earth exchanged material was blended with 90 grams of hydrous alumina containing 66.5% solids at 1000° F. The dry blended product was pelleted and sized to 4 x 10 mesh size particles. The particles so obtained were calcined for 10 hours at 1000° F. and then steam treated at 1200° F. for 24 hours at 15 p.s.i.g.

The resulting composition had a sodium content of 0.35 weight percent, a rare earth metal oxide content of 4.0 weight percent and a surface area of 167 m.²/g. after steaming.

EXAMPLE 13

The composition of this example was prepared as described in Example 12 except that hydrous clay was used as the diluting matrix.

In this example, 22 grams of the dried rare earth exchanged material was blended with 76 grams of raw McNamee clay (88% solids at 1000° F.). The dry blended product was then pelleted, calcined and steamed as in the preceding example.

The final composition had a sodium content of 0.44 weight percent, a rare earth metal oxide content of 4.0 weight percent and a surface area of 105 m.²/g. after steaming.

The characteristics and results obtained upon testing the compositions of Examples 11–13 for catalytic cracking activity are shown below in Table III:

The above solutions were mixed together continuously through a nozzle adding 430 cc. per minute of solution A to 410 cc. per minute of solution B. The resulting hydro-

TABLE III

| Example | 11 | 12 | 13 | |
|---|---|---|---|---|
| Description: | | | | |
| Matrix | 75% Hydrous Alumina | 75% Hydrous Alumina | 75% Hydrous Clay | |
| Fines: | | | | |
| Type | LaHY | REHY | REHY | |
| Conc. | 25 | 25 | 25 | |
| Composition: | | | | |
| Na, Wt. percent | 0.3 | 0.35 | 0.44 | |
| $(RE)_2O_3$, Wt. percent | 4.25 | 4.0 | 4.0 | |
| Physical Properties: Steamed Surface Area, m.$^2$/g. | 172 | 167 | 105 | |
| Catalytic Evaluation: | | | | |
| Conversion, Vol. percent | 64.5 | 62.3 | 77.2 | 66.8 |
| LHSV | 4 | 4 | 4 | 8 |
| 10 RVP Gaso., Vol. percent | 59.2 | 57.5 | 60.6 | 58.1 |
| Excess $C_4$'s, Vol. percent | 8.9 | 7.8 | 16.2 | 11.8 |
| $C_5$+Gasoline, Vol. percent | 55.9 | 54.2 | 58.1 | 55.1 |
| Total $C_4$'s, Vol. percent | 12.2 | 11.1 | 18.8 | 14.8 |
| Dry Gas, Wt. percent | 5.6 | 5.5 | 10.1 | 6.3 |
| Coke, Wt. percent | 2.0 | 2.2 | 4.4 | 2.6 |
| Advantage Over Standard Cracking Catalyst:* | | | | |
| 10 RVP, Vol. percent | +12.2 | +11.5 | +8.6 | +10.1 |
| Excess $C_4$'s, Vol. percent | −6.5 | −6.8 | −5.4 | −4.7 |
| $C_5$+ Gasoline, Vol. percent | +11.1 | +10.4 | +7.7 | +9.1 |
| Total $C_4$'s, Vol. percent | −5.4 | −5.7 | −4.4 | −3.7 |
| Dry Gas, Wt. percent | −2.9 | −2.5 | −0.9 | −2.6 |
| Coke, Wt. percent | −3.4 | −2.8 | −3.6 | −3.2 |
| $C_5$+ Gasoline Yield Advantage over $SiO_2$-$Al_2O_3$—REHX** | +5.1 | +4.4 | | +3.2 |

*Commercial silica-alumina catalyst containing approximately 90% $SiO_2$ and 10% $Al_2O_3$.
**13X zeolite base exchanged with rare earth-ammonium chloride and contained in matrix of $SiO_2$-$Al_2O_3$ gel.

The following examples demonstrate that sodium Y-aluminosilicate can be preexchanged with rare earth metal chloride and thereafter incorporated in a silica-alumina hydrosol to form catalyst beads having exceptional properties.

EXAMPLE 14

The composition of this example was prepared by mixing the following reactants.

A. Silicate slurry solution:

(1)

7.3 lbs. N-brand sodium silicate (28.5 wt. percent $SiO_2$, 8.8 wt. percent $Na_2O$, 62.7 wt. percent $H_2O$)
3.69 lbs. water (2)

3.30 lbs. water
0.895 lb. of rare earth exchanged sodium Y-aluminosilicate (56% solids)

Solution 2 was added to solution 1 with vigorous agitation to yield a resulting solution having a specific gravity of 1.179 at 78° F. The rare earth aluminosilicate was prepared by base exchanging sodium Y-aluminosilicate with a 5 weight percent rare earth metal chloride solution to give a product of 2.4 weight percent residual sodium content.

B. Acid solution:

52.1 lbs. of water
4.23 lbs. $Al_2(SO_4)_3 \cdot 18H_2O$
1.98 lbs. $H_2SO_4$ (97 percent)
Specific gravity at 77° F.=1.056 sol having a pH of 8.5 was introduced in the form of globules into a body of oil wherein it set to beads of hydrogel in 2.2 seconds at 67° F.

The resulting bead hydrogel was then base exchanged with a 1 weight percent aqueous solution of ammonium chloride continuously for 24 hours. Such exchange was equivalent to twelve 2 hour contacts using ½ volume of solution per volume of bead hydrogel.

The exchanged hydrogel was thereafter washed free of soluble anions, dried in air at 270° F. for 24 hours, tempered 10 hours at 1000° F. in air and finally treated with steam at 1200° F. for 24 hours at 15 p.s.i.g.

The final composition contained 0.4 weight percent sodium and 2.49 weight percent rare earth metal oxides. The surface area of the composition after steaming was 182 m.$^2$/g.

EXAMPLE 15

The composition of this example was prepared in the same manner as that of Example 14 except that base exchange of the bead hydrogel was accomplished first by contacting with a 2 weight percent aqueous solution of $LaCl_3 \cdot 6H_2O$ for 16 hours and then a continuous exchange with a 1 weight percent aqueous solution of ammonium chloride for 24 hours followed by washing, drying, tempering and steaming as in Example 14.

The final composition contained 0.43 weight percent sodium and a rare earth metal oxide content of 8.29 weight percent $(RE)_2O_3$. The surface area of the composition after steaming was 251 m.$^2$/g.

The characteristics and results obtained upon testing the compositions of Examples 14 and 15 for catalytic cracking activity are shown below in Table IV:

TABLE IV

| Example | 14 | 15 |
|---|---|---|
| Description: | | |
| Matrix | Si/Al (94 percent SiO$_2$-6 percent Al$_2$O$_3$) | |
| Fines: | | |
| Type | REY | REY |
| Conc. | 20 | 20 |
| Base Exchange: | | |
| Solution | NH$_4$Cl | LaCl$_3$·6H$_2$O then NH$_4$Cl |
| Conc., Wt. Percent | 1 | 2   1 |
| Contacts | 1-24 hour continuous | 1-16 hour   1-24 hour continuous |
| Composition: | | |
| Na, Wt. Percent | 0.4 | 0.43 |
| (RE)$_2$O$_3$, Wt. Percent | 2.49 | 8.29 |
| Physical Properties: Steamed Surface Area, m.$^2$/g | 182 | 251 |
| Catalytic Evaluation: | | |
| Conversion, Vol. Percent | 65.9 | 69.0 |
| LHSV | 4 | 4 |
| 10 RVP Gaso., Vol. Percent | 56.7 | 62.9 |
| Excess C$_4$'s, Vol. Percent | 10.2 | 6.8 |
| C$_5$+ Gasoline, Vol. Percent | 53.9 | 58.3 |
| Total C$_4$'s Vol. Percent | 13.0 | 11.5 |
| Dry Gas, Wt. Percent | 7.9 | 7.0 |
| Coke, Wt. Percent | 2.6 | 2.5 |
| Advantage Over Standard Cracking Catalyst:* | | |
| 10 RVP, Vol. Percent | +9.0 | +13.9 |
| Excess C$_4$'s, Vol. Percent | −5.8 | −10.7 |
| C$_5$+ Gasoline, Vol. Percent | +8.4 | +11.3 |
| Total C$_4$'s, Vol. Percent | −5.2 | −8.0 |
| Dry Gas, Wt. Percent | −0.8 | −2.3 |
| Coke, Wt. Percent | −0.3 | −3.8 |
| C$_5$+ Gasoline Yield Advantage over SiO$_2$-Al$_2$O$_3$—REHX** | +2.4 | +5.4 |

*Commercial silica-alumina catalyst containing approximately 90% SiO$_2$ and 10% Al$_2$O$_3$.
**13X zeolite base exchanged with rare earth-ammonium chloride and contained in matrix of SiO$_2$-Al$_2$O$_3$ gel.

EXAMPLE 16

This example demonstrates that catalyst having good activity and selectivity can be prepared using pre-exchanged rare earth metal Y-aluminosilicate along with added pulverized material for increased diffusivity. In this instance, the catalyst was prepared in the same manner as that of Example 14 but the fines material was 5 weight percent rare earth metal Y-aluminosilicate and 24 weight percent clay having a weight mean particle diameter of 4–5 microns. The resulting bead hydrogel was base exchanged, washed, dried, tempered and steam treated in the same manner as described in Example 14.

The final composition contained 0.18 weight percent sodium, 0.95 weight percent rare earth metal oxide and 16.6 weight percent aluminum oxide. The surface area of the composition after steaming was 126 m.$^2$/g.

The results obtained upon testing the composition of this example for catalytic cracking activity are shown below in Table V.

TABLE V

Example 16:
  Description—
    Matrix _____Si/Al (94% SiO$_2$–6% Al$_2$O$_3$)
    Fines: Type and conc. _____5% REY+24% clay.
  Base exchange—
    Solution _____NH$_4$Cl.
    Conc., wt. percent _____1.
    Contacts _____1–24 hours continuous at room temperature equivalent to 12–2 hour changes.
  Composition—
    Na, wt. percent _____0.18.
    (RE)$_2$O$_3$, wt. percent _____0.95.
    Al$_2$O$_3$, wt. percent _____16.6.
  Physical properties—
    App. dens. g./cc. _____0.78.
    Steamed surface area, m.$^2$/g. _____126.
  Catalytic evaluation—
    Conversion, vol. percent ____51.6.
    LHSV _____4.
    10 RVP gaso., vol. percent 46.4.
    Excess C$_4$'s vol. percent ___7.0.
    C$_5$+ gasoline, vol. percent _43.6.
    Total C$_4$'s, vol. percent ____9.9.
    Dry gas, wt. percent _____5.0.
    Coke, wt. percent _____1.2.
  Advantage over standard cracking catalyst[1]—
    10 RVP, vol. percent _____+5.9.
    Excess C$_4$'s, vol. percent ___−4.0.
    C$_5$+ Gasoline, vol. percent +5.4.
    Total C$_4$'s, vol. percent ____−3.4.
    Dry gas, wt. percent _____−1.2.
    Coke, wt. percent _____−1.9.

[1] Commercial silica-alumina catalyst containing approximately 90% SiO$_2$ and 10% Al$_2$O$_3$.

EXAMLE 17

This example demonstrates the use as a matrix for the above type catalysts of a powdered metal.

Y-zeolite was prepared as in Example 1 and base exchanged with an aqueous solution containing 2 weight percent ammonium chloride and 5 weight percent of mixed rare earth metal chloride having the following composition: 1.57 percent cerium chloride, 0.83 percent lanthanum chloride, 0.17 percent praseodymium chloride, 0.58 neodymium chloride and traces of samarium chloride, gadolinium chloride and other rare earth metal chlorides. Base exchange was carried out continuously for 48 hours at 180° F. using the equivalent of 24-two hour changes with 1 volume of solution per volume of slurry. The base exchanged material was then washed free of chloride, dried 24 hours at 230° F., tempered at 1000° F. for 10 hours in air and finally contacted with 100 percent steam at atmospheric pressure for 20 hours at 1225° F. The residual sodium content of the base exchanged material was 1.32 weight percent. Such base exchanged aluminosilicate was blended with aluminum powder by intimately mixing 50 grams of the dried rare earth hydrogen Y-aluminosilicate with 150 grams of metallic aluminum powder (Alcoa grade 101) in a ball mill for 4 hours. The blended material was then pelleted, sized to 4 x 10 mesh particles, tempered 10 hours at 1000° F. in air and finally steam treated at 1200° F. for 24 hours at 15 p.s.i.g.

The composition so obtained had a sodium content of 0.09 weight percent and a rare earth metal oxide content of 2.76 weight percent. The surface area of the composition after steaming was 76 m.²/g.

The results obtained upon testing the composition of this example for catalytic cracking activity are shown below in Table VI:

TABLE VI

EXAMPLE 17:

Description—
  Matrix _____ Powdered aluminum n
  Fines: Type and
    conc. _____ REHY 25%.
Composition—
  Na, wt. percent ___ 0.09.
  (RE)$_2$O$_3$, wt. percent _____ 2.76.
Physical properties—
  App. dens. g./cc. ___ 0.76.
  Steamed surface area, m.²/g. _____ 76.
Catalytic evaluation—
  Conversion, vol. percent _____ 71.9.
  LHSV _____ 4.
  10 RVP Gaso., vol. percent _____ 64.3.
  Excess C$_4$'s, vol. percent _____ 12.0.
  C$_5$+gasoline, vol. percent _____ 61.1.
  Total C$_4$'s, vol. percent _____ 15.3.
  Dry gas, wt. percent _____ 5.9.
  Coke, wt. percent _ 2.6.
  H$_2$, wt. percent ___ 0.02.
Advantage over standard cracking catalyst [1]—
  10 RVP, vol. percent _____ +14.2.
  Excess C$_4$'s, vol. percent _____ −6.9.
  C$_5$+Gasoline, vol. percent _____ +12.8.
  Total C$_4$'s, vol. percent _____ −5.5.
  Dry Gas, wt. percent _____ −3.9.
  Coke, wt. percent _ −4.2.

[1] Commercial silica-alumina catalyst containing approximately 90% SiO$_2$ and 10% Al$_2$O$_3$.

It will be seen from the foregoing data that the resulting cataylst containing 25 weight percent of rare earth hydrogen aluminosilicate has superior catalytic properties. The catalytic data summaried in Table VI show this cataylst to be extremely selective affording approximately 12.8 volume percent of C$_5$+ gasoline advantage over standard silica-alumina cracking catalyst.

We claim:
1. A catalytic composition comprising a finely divided crystalline aluminosilicate having a silica to alumina mole ratio in excess of 3 distributed throughout and held suspended in a matrix therefor, wherein the negative electrovalence of the silica and alumina of said aluminosilicate is balanced by ions of at least one member selected from the group consisting of metals below sodium in the electromotive series, calcium, ammonium, hydrogen and combinations of such ions with one another.

2. A catalytic composition comprising a Y-crystalline aluminosilicate, the cation of which is selected from at least one member of the group consisting of metals below sodium in the electromotive series, calcium, ammonium, hydrogen and combinations of such ions with one another, said aluminosilicate being in finely divided form and held together in the form of an aggregate particle by a binder therefor posessing an intrinisic catayltic activity.

3. A catalytic composition comprising 1 to 90 percent by weight of a Y-crystalline aluminosilicate, the original exchangeable alkali metal ions of which have been substantially completely replaced by ions of at least one member selected from the group consisting of metals below sodium in the electromotive series, calcium, ammonium, hydrogen and combinations of such ions with one another, said aluminosilicate being in finely divided form and suspended in and distributed throughout a matrix therefor.

4. The composition of claim 3 wherein said matrix is selected from the group consisting of hydrous oxide, inorganic oxide gel, metal and clay.

5. A catayltic composition made up of spheroidal particles comprising approximately 1 to 50 percent by weight of a Y-crystalline aluminosilicate, the original exchangeable alkali metal ions of which have been substantially completely replaced by ions of at least one member selected from the group consisting of metals below sodium in the electromotive series, calcium, ammonium, hydrogen and combinations of said ions with one another, said aluminosilicate being in finely divided form and suspended in and distributed throughout an inorganic oxide gel matrix.

6. A catalytic composition comprising a Y-crystalline aluminosilicate, the original exchangeable alkali metal ions of which have been substantially completely replaced by ions of at least one member selected from the group consisting of metals below sodium in the electromotive series, calcium, ammonium, hydrogen and combinations of said ions with one another, and a secondary solid additive capable of imparting increased diffusivity to said composition, said aluminosilicate and additive being in finely divided form and suspended in and distributed throughout a matrix therefor.

7. The composition of claim 6 wherein said secondary solid additive is a clay.

8. The composition of claim 6 wherein said secondary solid additive constitutes fines of said catalytic composition.

9. A catalytic composition containing, as an essential component thereof, a rare earth metal Y-crystalline aluminosilicate, in finely divided form, suspended in and distributed throughout a porous matrix therefor, said matrix possessing an intrinsic catalyst activity and being selected from the group consisting of silica-alumina hydrogel, alumina, clay and combinations thereof, said composition having an alkali metal content of less than 2% by weight.

10. A catalytic composition containing, as an essential component thereof, a rare earth metal hydrogen Y-crystalline aluminosilicate, in finely divided form, suspended in and distributed throughout a matrix therefor.

11. A catalytic composition containing, as an essential component thereof, an alkaline earth metal Y-crystalline aluminosilicate, in finely divided form, suspended in and distributed through a porous matrix therefor, said matrix possessing an intrinsic catalytic activity and being selected from the group consisting of silica-alumina hydrogel, alumina, clay and combinations thereof.

12. A catalytic composition containing, as an essential component thereof, a lanthanum Y-crystalline aluminosilicate, in finely divided form, suspended in and distributed throughout a matrix therefor.

13. A catalytic composition containing, as an essential component thereof, a manganese Y-crystalline aluminosilicate, in finely divided form, suspended in and distributed throughout a matrix therefor.

14. A catalytic composition containing, as an essential component thereof, a lanthanum hydrogen Y-crystalline aluminosilicate, in finely divided form, suspended in and distributed throughout a matrix therefor.

15. A catalytic composition containing, as an essential component thereof, a magnesium Y-crystalline aluminosilicate, in finely divided form, suspended in and distributed throughout a matrix therefor.

16. A catalytic composition containing, as an essential component thereof, a magnesium Y-crystalline aluminosilicate, in finely divided form, suspended in and distributed throughout a porous matrix therefor, said matrix possessing an intrinsic catalytic activity and being selected from the group consisting of silica-alumina hydrogel, alumina, clay and combinations thereof, said composition having an alkali metal content of less than 2% by weight.

17. A catalytic composition made up of spheroidal particles comprising approximately 1 to 50 percent by weight of a Y-crystalline aluminosilicate, the original exchangeable alkali metal ions of which have been substantially completely replaced by ions of at least one member selected from the group consisting of rare earth metals, calcium, magnesium, manganese, ammonium, hydrogen and combinations of said ions with one another, said aluminosilicate being in finely divided form and suspended in and distributed throughout a matrix of an inorganic oxide gel selected from the group consisting of alumina, silica and composites of silica and an oxide of at least one metal selected from the group consisting of metals of Groups II-A, III-B and IV-A of the Periodic Table.

18. A method for preparing a catalytic composition which comprises intimately admixing an alkali metal aluminosilicate having a silica to alumina mole ratio in excess of 3 in finely divided form with a binder therefor and base exchanging the resulting composite with a solution containing ions of at least one member selected from the group consisting of metals below sodium in the electromotive series, calcium, ammonium, hydrogen and combinations of such ions with one another to replace at least about 70 percent of the original alkali metal ion content of said aluminosilicate and to reduce the exchangeable alkali metal content of the resulting base exchanged composite to less than 3 percent by weight.

19. A method for preparing a catalytic composition which comprises intimately admixing an alkali metal Y-aluminosilicate in finely divided form with a binder therefor and base exchanging the resulting composite with a solution containing ions of at least one member selected from the group consisting of metals below sodium in the electromotive series, calcium, ammonium, hydrogen and combinations of said ions with one another to replace at least about 70 percent of the original alkali metal ion content of said aluminosilicate and to reduce the exchangeable alkali metal content of the resulting base exchanged composite to less than 3 percent by weight.

20. A method for preparing a catalytic composition which comprises effecting intimate admixture in a matrix of a finely divided aluminosilicate having a silica to alumina mole ratio in excess of 3 in which at least 70 percent of the original alkali metal content thereof has been replaced with ions of at least one member selected from the group consisting of metals below sodium in the electromotive series, calcium, ammonium, hydrogen and combinations of such ions with one another, drying and calcining the resulting composite.

21. A method for preparing a catalytic composition which comprises effecting dispersion in a matrix of a finely divided Y-aluminosilicate in which at least 70 percent of the original alkali metal content thereof has been replaced with ions of at least one member selected from the group consisting of metals below sodium in the electromotive series, calcium, ammonium, hydrogen and combinations of said ions with one another, said aluminosilicate having uniform pore openings between about 6 and about 15 Angstrom units, drying, calcining and treating the resulting composite with steam at a temperature between about 400 and about 1500° F. for at least about 2 hours.

22. A method for preparing a catalytic composition which comprises dispersing in an inorganic sol a finely divided Y-aluminosilicate resulting from substantially complete base exchange of the exchangeable alkali metal content of crystalline Y alkali metal aluminosilicate having uniform pore openings between 6 and 15 Angstrom units with a solution containing ions of at least one member selected from the group consisting of metals below sodium in the electromotive series, calcium, ammonium, hydrogen and combinations of said ions with one another, effecting gelation of the sol containing finely divided aluminosilicate, washing the treated composite free of soluble matter, drying and calcining.

23. A method for preparing a catalytic composition which comprises dispersing in an inorganic sol finely divided alkali metal Y-aluminosilicate, effecting gelation of said sol containing finely divided aluminosilicate, base exchanging the resulting composite with a solution containing ions of at least one member selected from the group consisting of metals below sodium in the electromotive series, calcium, ammonium, hydrogen and combinations of said ions with one another to yield a product having an alkali metal content of less than 3 percent by weight, washing the treated composite free of soluble matter, drying and calcining.

24. A method for preparing a catalytic composition which comprises effecting dispersion in a matrix of (1) a finely divided Y-aluminosilicate in which at least 70 percent of the original alkali metal content thereof has been replaced with ions of at least one member selected from the group consisting of metals below sodium in the electromotive series, calcium, ammonium, hydrogen and combinations of said ions with one another, said aluminosilicate having uniform pore openings between about 6 and about 15 Angstrom units and (2) a finely divided secondary solid additive capable of imparting increased diffusivity to said composition, washing the resulting composite free of soluble matter, drying and calcining.

25. A catalytic composition containing, as an essential component thereof, a calcium Y-crystalline aluminosilicate, in finely divided form, suspended in and distributed throughout a matrix therefor.

References Cited

UNITED STATES PATENTS

| 3,130,006 | 4/1964 | Rabo et al. | |
| 3,140,249 | 7/1964 | Plank et al. | 208—120 |
| 3,140,251 | 7/1964 | Plank et al. | 208—120 |
| 3,033,778 | 5/1962 | Frilette | 208—120 |
| 2,962,435 | 11/1960 | Fleck et al. | 208—120 |
| 2,971,903 | 2/1961 | Kimberlin et al. | 208—119 |
| 2,983,670 | 5/1961 | Seubold | 208—110 |

DANIEL E. WYMAN, *Primary Examiner.*

CARL F. DEES, *Assistant Examiner.*

U.S. Cl. X.R.

208—120